United States Patent [19]

De Groef et al.

[11] 4,144,404
[45] Mar. 13, 1979

[54] COAXIAL CABLE CONNECTOR AND METHOD OF MAKING A COAXIAL CABLE CONNECTION

[76] Inventors: Pierre De Groef, Rue Victor Aliard, 13, 1180 Brussels; Frank Selleslags, Lievenrouwkestraat 15, 3044 Haasrode, both of Belgium

[21] Appl. No.: 715,402

[22] Filed: Aug. 18, 1976

Related U.S. Application Data

[63] Continuation-in-part of Ser. No. 607,249, Aug. 25, 1975, abandoned, which is a continuation of Ser. No. 452,128, Mar. 18, 1974, abandoned.

[30] Foreign Application Priority Data

Mar. 21, 1973 [GB] United Kingdom ............... 13584/73

[51] Int. Cl.$^2$ .......................... H01R 5/04; H01R 5/08
[52] U.S. Cl. .................................... 174/88 C; 29/628; 174/84 R; 174/DIG. 8; 228/56; 285/287; 285/381; 403/272; 403/273
[58] Field of Search ................. 174/35 C, 75 C, 84 R, 174/88 C, 91, 92, 93, DIG. 8; 29/628; 156/49; 228/56; 285/287, 381; 339/177 R, 177 E, 275 R, DIG. 1; 403/28, 270–273

[56] References Cited

U.S. PATENT DOCUMENTS

| 2,972,657 | 2/1961 | Stemke | 174/84 R |
| 3,253,619 | 5/1966 | Cook et al. | 174/DIG. 8 X |
| 3,312,772 | 4/1967 | Sherlock | 174/DIG. 8 X |
| 3,541,495 | 11/1970 | Ellis et al. | 174/DIG. 8 X |
| 3,818,123 | 6/1974 | Maltz et al. | 174/88 C |

FOREIGN PATENT DOCUMENTS

| 263110 | 7/1968 | Austria | 174/84 R |
| 2413734 | 10/1974 | Fed. Rep. of Germany | 174/88 C |

*Primary Examiner*—Laramie E. Askin
*Attorney, Agent, or Firm*—Lyon & Lyon

[57] ABSTRACT

The invention relates to a connector and method of connecting electrical conductors or other substrates. It is particularly suited to making connections between coaxial cables, even those having different diameters. The connector is a shell comprising a hollow heat-recoverable member having two open ends, an electrically conductive deformable member disposed within the heat-recoverable member and a quantity of solder also disposed within the heat-recoverable member. To make a connection, the conductors are inserted into different ends of the sleeve and the assembly heated to cause recovery of the heat-recoverable member. The recovery force of the recoverable member deforms the deformable member into close contact with the conductors to provide mechanical strength to the connection and electrical contact between the conductors. The heat used to bring about recovery also fuses the solder to improve both the mechanical and electrical integrity of the connection.

71 Claims, 20 Drawing Figures

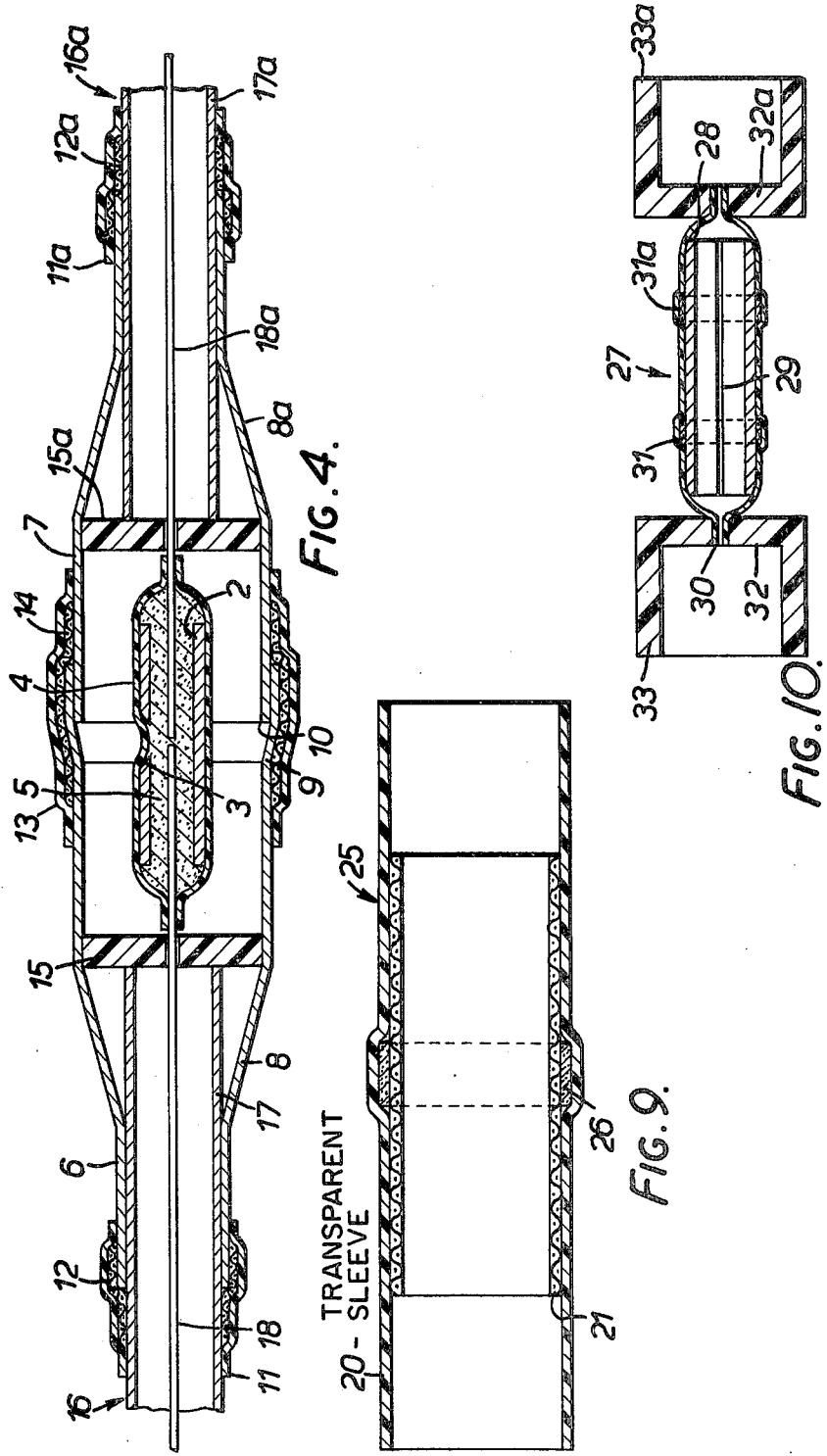

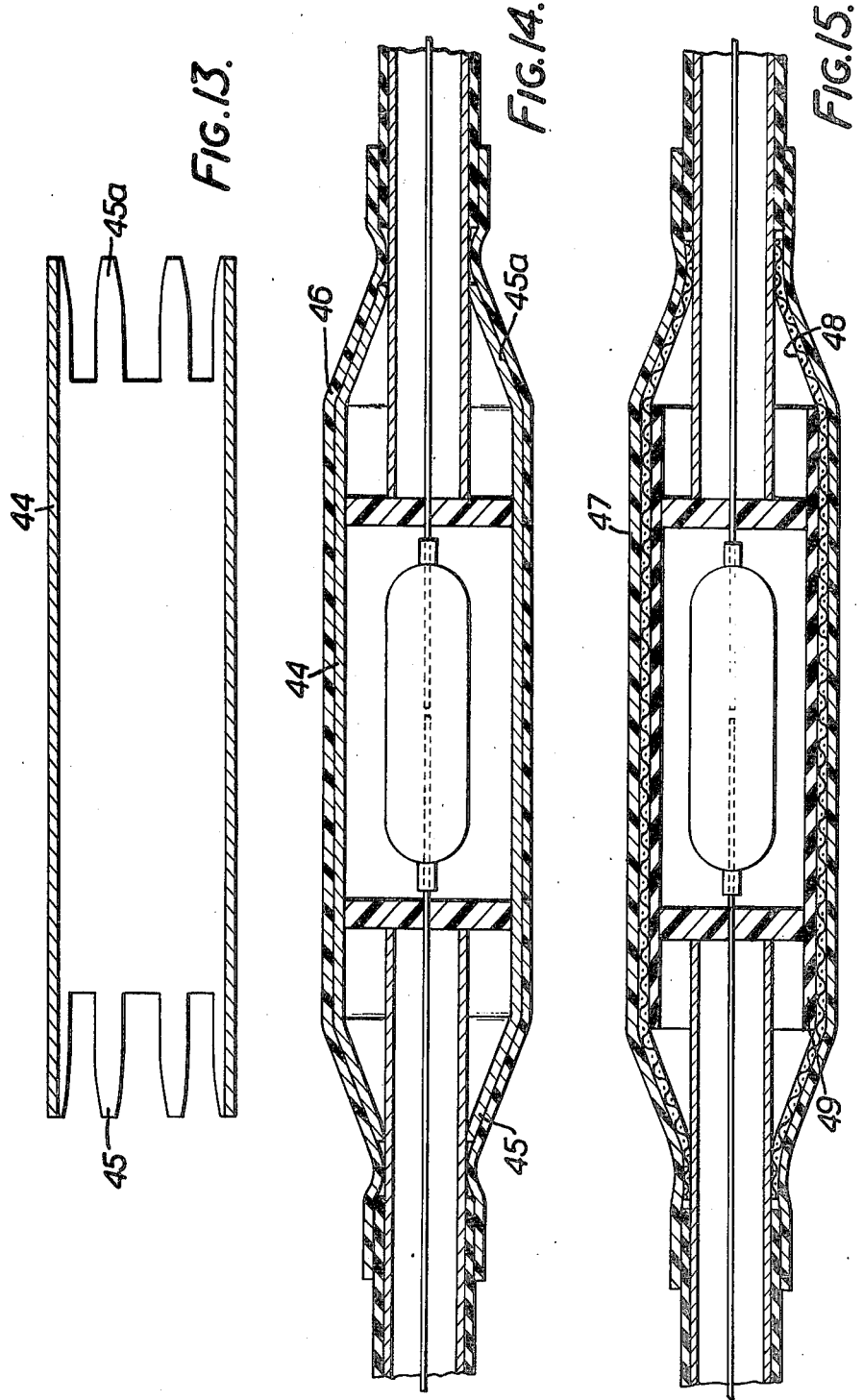

COAXIAL CABLE CONNECTOR AND METHOD OF MAKING A COAXIAL CABLE CONNECTION

CROSS REFERENCE TO RELATED APPLICATIONS

This application is a continuation-in-part of copending application Ser. No. 607,249 filed Aug. 25, 1975 (now abandoned) which is a continuation of application Ser. No. 452,128 filed Mar. 18, 1974 and now abandoned. The disclosures of these applications are incorporated herein by reference.

BACKGROUND OF THE INVENTION

There are many situations where it is necessary to make a strong and reliable connection between two substrates. As well as the more general difficulties connected with splicing, particular difficulties may arise, if for example, the substrates to be joined are not of the same size or if an electrical, as well as a mechanical, connection is to be made. One field where a great number of problems have arisen is in the splicing of coaxial cables.

Many methods have previously been proposed for splicing two coaxial cables. All of the previously proposed methods, however, suffer from one or more disadvantages, for example, an imperfect impedance match (which can result in the signal being distorted or garbled), the need to use complicated or time-consuming steps to make the splice, degradation of electrical contact with time, or high expense. A further disadvantage inherent in most previously proposed splicing methods is that the coupling is mechanically weak. Ideally, the splice will have a tensile strength which is at least as great as that of the cable itself, but this ideal situation is rarely, if ever, achieved in the previously proposed splices.

Albert, U.S. Pat. No. 3,502,788 discloses a connector for coaxial cables having an inner tube through which the center conductors are inserted and connected. The tube may have solder wells for solder connecting the inner conductor. The outer conductors of the coaxial cables are connected via an outer rigid cylinder terminating in a flanged portion which contacts the inner surface of the outer conductor by positioning the spliced cable over the flange so it is interposed between the inner insulation covering the inner conductor, and the outer conductor. Electrical contact is obtained by placing a heat-shrinkable plastic member over a ferrule which is in contact with the outer cable insulation to cause, upon heating, the outer conductor to be compressed inwardly against the flange. Such a configuration suffers from the disadvantage that electrical contact is dependent entirely on the pressure exerted by the heat-shrinkable member due to the non-deformability of the flange. In addition, the flange must be of precise dimension as to be inserted between the outer conductor and the inner insulation.

Cook et al., U.S. Pat. No. 3,253,619 discloses a conductor in which a deformable, metallic braid is interposed between an inner tube and an outer jacket in which the jacket and tube may be heat-deformable and serve as inner and outer insulation for coaxial cables. It has been suggested that such a braid may serve as the electrically conductive shield for coaxial cable and mention is made of its use in caps, splices and closures. Nonetheless, there is no teaching of how the braid is used to interconnect coaxial cable, combination with a non-deformable shell or solder impregnation.

The present invention utilizes a deformable and flexible metallic member, such as a braid, to effect electrical connection between the outer conductors of the coaxial cable. Utilizing such a deformable, metallic connection instead of a rigid metal flange provides several advantages. First, greater variations in cable dimensions can be tolerated. Also, cables of different dimensions can be joined. In addition, upon the shrinking of a heat-recoverable outer tube, electrical contact is assured since the metallic braid will readily deform and contact the outer conductor. An even more reliable connection is obtained by impregnating the braid with solder which will bond the braid to the outer conductor during the heat-shrink operation.

SUMMARY OF THE INVENTION

The present invention provides a method of connecting two coaxial cables wherein the outer conductors are connected by means of a shell comprising an electrically conductive deformable end member, a hollow heat-recoverable member having two open ends, and a quantity of solder, the deformable end member being infusible at the temperature to which the components are heated to cause the heat-recoverable member to recover and the solder to fuse and being such that, at that temperature, it can be deformed by the force exerted by the heat-recoverable member, the components being heated to cause the solder to fuse and to cause the heat-recoverable member to recover and deform at least a part of the deformable member. If desired, the deformable member may be first attached to, or integral with, one of the conductors. Alternatively, the deformable member and the solder may be positioned in the direction of recovery of the heat-recoverable member before the conductors are positioned.

The use of a heat-recoverable member, solder, and a deformable member to connect to conductors makes it possible to obtain a reliable and strong connection even when the parts to be connected are spaced apart, for example, when they are of different diameters. Thus, in such a case, at one end the deformable member will be forced by the heat-recoverable member into contact with the larger diameter part and at the other end it will be forced into contact with the smaller diameter part, the solder ensuring that a good connection is made in each case. Even when, however, the parts to be connected are not spaced apart, the use of a sleeve containing a deformable member as well as solder is an advantage as the deformable member may strengthen the joint made. The method of the invention has the additional advantage that the deformable member provides a good electrical path between conductors. This is clearly particularly useful when the conductors are spaced apart, but is also an advantage when the substrates are in contact as the fact that an electrical connection between the substrates is made through the deformable member as well as through the solder makes it possible to obtain a reliable connection without the need for preliminary soldering of the joint.

The present invention also provides a method of electrically connecting two cables each of which comprises an inner conductor and an outer conductor, which method comprises electrically connecting the inner conductors of the cables, and making an electrical connection between the outer conductors by means comprising a doformable electrically conductive member, a hollow heat-shrinkable member having two open ends, and a quantity of solder, the deformable electrically conductive member being infusible at the temperature to which the parts are heated to cause the heat-shrinkable member to shrink and the solder to fuse and being such that, at that temperature, it is deformable by the force exerted by the heat-shrinkable member, the heat-shrinkable member being shrunk to deform at least a part of the deformable member. In the completed splice made by this method, the electrical connection between the outer conductors is advantageously at a predetermined distance from the electrical connection between the inner conductors as such an arrangement is important in the production of matched impedance splices.

There are a number of ways in which the dimensions of the splice in the outer conductors can be controlled. One of these involves using as the heat-shrinkable member a moulded part recoverable to a configuration in which the center portion thereof has a particular desired diameter, the deformable member being bonded to the interior surface of the heat-shrinkable member. In this embodiment the deformable member may comprise, for example, metallic braid or metal plating on the moulded part. Another method for controlling the dimensions of the splice comprises using an elongate hollow member having two open ends, which hollow member may comprise two or more parts and is substantially undeformable by the force exerted by the heat-shrinkable member when the components are heated to cause the heat-shrinkable member to shrink and the solder to fuse. At least the center portion of the substantially undeformable member is advantageously generally cylindrical.

The inner conductors are connected by inserting them into an inner non-deformable tube having an aperture therein. Solder is placed on the aperture or inside the tube. A heat-recoverable member is placed over the tube so that upon heating it exerts pressure at the aperture against the solder causing it to melt and flow, insuring a good connection of the inner conductors.

PREFERRED EMBODIMENT

In a preferred method of electrically connecting the outer conductors of the cables, the substantially undeformable member has dimensions such that it can receive at least one of the cables without the necessity of stripping from the latter any insulating layers that may be present around the outer conductor. This has the advantage that the substantially undeformable member can be slipped over an unstripped portion of the cable while the inner conductors are being joined and can then be positioned around the splice between the inner conductors. If the substantially undeformable member is not large enough to receive the unstripped cables, it is necessary either to use a member which is in two or more parts and can be assembled around the inner conductor splice (with consequent increase of the time required for making the splice) or to strip the insulation from a relatively long length of the outer conductor, which makes it necessary to provide additional insulation when the splice has been made.

If for some reason it is desired to use a substantially undeformable member which is in more than one part, the member may comprise two parts such that, when it is assembled, it has two longitudinal seams. Alternatively, the substantially undeformable member may comprise two parts, each part comprising a first end portion for receiving the outer conductor of a cable and a second end portion for positioning in telescopic relationship with the second end portion of the other part. Each of the parts may be so shaped that the impedance in the region of the splice is substantially constant and substantially equal to the impedance of each of the cables. Preferably, the first end portion of each of the parts is generally cylindrical and the second end portion is also generally cylindrical, the second end portion being coaxial with, and of larger diameter than, the first end portion. The second end portion of one of the parts may have an enlarged diameter at the open end for receiving the second end portion of the other part, and each first end portion may, if desired, be provided with one or more apertures through which solder can pass.

Whether the substantially undeformable member comprises one part, or more than one part, this member may, if desired, be provided with an aperture through which heat can be applied to the interior of the member. If such an aperture is provided, it is not necessary to make the splice in the inner conductors before the substantially undeformable member is brought into its final position (and it is thus possible to supply a one-piece connector) as, for example, heat can be applied through the aperture to cause a heat-recoverable solder-containing sleeve positioned round the inner conductors to shrink and the solder to fuse. Various other methods of joining the inner conductors are given below. When the substantially undeformable member includes an aperture, means may be provided for closing the aperture in order, for example, to ensure electrical continuity in an electrically conductive substantially undeformable member.

The substantially undeformable member may comprise electrically insulating material. In this case, the electical connection between the outer conductors is made solely through the deformable member and the solder and, where a good impedance match is required, it is desirable that there should be substantially no discontinuities in the electrical path. Thus, for instance, if the deformable member comprises a metallic braid, this is advantageously impregnated with the solder so that substantially no holes remain in the braid. An electrically insulating substantially undeformable member may take the form of a simple sleeve or may be, for example, a moulded part which can recover on heating to a desired shape; in either of these cases the substantially undeformable member may be positioned around the inner conductor splice and the heat-shrinkable member and the deformable member are recovered around the substantially undeformable member and assume its shape.

In a preferred embodiment of the invention, the substantially undeformable member comprises electrically conductive material and the electrical connection between the outer conductors is made through the substantially undeformable member as well as through the deformable member, an electrical connection between at least one of the end portions of the substantially undeformable member and the adjacent outer conductor being made by shrinking of the, or a respective, heat-shrinkable member and the, or a respective deformable member. If an electrically conductive substantially undeformable member has the preferred form mentioned above (that is, if it has dimensions such that it can be slipped over an unstripped cable, it will not, of course, contact the outer conductor of that cable. As explained above, however, such contact is not necessary in the method of the present invention as an electrical connection between the elongate hollow member and the outer conductor is made by means of the solder and deformable member. The fact that it is not necessary for the substantially undeformable member to contact the outer conductors also has the advantage that a single elongate hollow member can be used for a variety of cable sizes and that a hollow member of uniform cross-section may be used for joining cables of different sizes.

When the substantially undeformable member comprises electrically conductive material, at at least one end of that member, the deformable member may be attached to it or integral with it. Thus, for example, the deformable member may consist of a plurality of flat parallel prongs extending from an integral band, which band may be integral with, or attached to, the substantially undeformable member. When a deformable member is attached to or integral with the substantially undeformable member, the heat-shrinkable member used to deform that deformable member may if desired have positioned within it a further deformable electrically conductive member.

When an electrically conductive substantially undeformable member is used, at least one end portion of this member may be shaped slidingly to receive the outer conductor of one of the cables. Alternatively, at least one end portion of the substantially undeformable member may have a diameter substantially the same as that of one of the outer conductors so that it can be placed in abutting relationship to that conductor. Where one end portion of the substantially undeformable member abuts or slidingly receives the outer conductor of one of the cables, it may, like the other portion, be electrically connected to the outer conductor by means of a heat-shrinkable member, an electrically conductive deformable member, and a quantity of solder. Alternatively, however, said one end portion may be electrically connected to the outer conductor by capillary soldering, and/or by means of a heat-shrinkable sleeve containing a quantity of solder, and/or by means of a substantially undeformable short tube of electrically conductive material, which tube slidingly receives, and is soldered to, the end portion of the substantially undeformable member and the adjacent outer conductor. In a modification of the above method, each end portion of the substantially undeformable member is shaped to abut or slidingly to receive the respective outer conductor and is electrically connected thereto by capillary soldering and/or by means of a short tube of electrically conductive material, which tube slidingly receives, and is soldered to, the end portion of the substantially undeformable member and the adjacent outer conductor. The short tube strengthens a butt joint, and may be soldered to the substantially undeformable member and to the outer conductor by capillary soldering.

In a preferred cable splicing method according to the invention the means for making the electrical connection between the outer conductors comprises an electrically conductive generally cylindrical substantially undeformable member, which substantially undeformable member has dimensions such that it can receive at least one of the cables without any stripping of that cable, at least one heat-shrinkable sleeve member, at least one quantity of solder, and at least one electrically conductive deformable member. If desired, a separate heat-shrinkable member may be used for each end portion of the substantially undeformable member, each heat-shrinkable member having positioned within it a quantity of solder and an electrically conductive reinforcing member. Alternatively, a single heat-shrinkable member may be used to join the end portions of the substantially undeformable member to the outer conductors, which member contains a quantity of solder and an electrically conductive deformable member for each end portion. Advantageously, part of the heat-shrinkable member, or one of the heat-shrinkable members, is shrunk into contact with the substantially undeformable member before the latter is positioned adjacent to the outer conductors.

In a further advantageous splicing method according to the invention the means for making the electrical connection between the outer conductors comprises a two-part telescopic substantially undeformable member as described above, which member is electrically conductive, at least one heat-shrinkable sleeve member, at least one quantity of solder, and at least one electrically conductive deformable member. If desired, the electrical connection between the first end portion of each of the parts of the two-part elongate hollow member and the respective outer conductor may be made by means of a separate heat-shrinkable member, a quantity of solder, and a deformable member. Each of the first end portions may be provided with such a heat-shrinkable member before the part is slipped over the cable; part of the sleeve is shrunk into contact with the respective end portion. A heat-shrinkable member having a quantity of solder and an electrically conductive deformable member therein may also be used to ensure that a reliable electrical connection is made between the telescoped second end portions of the two parts of the shield. If desired, this sleeve may be preinstalled on one of the second end portions, preferably on the one of larger diameter, by shrinking part of the sleeve into contact with the second portion in question. It should be understood that, whatever form the substantially undeformable member takes, and whatever the material from which it is made, part of the, or of at least one of the, heat-shrinkable member(s) and, if appropriate, the associated deformable member may be shrunk into contact with the substantially undeformable member before the latter is positioned adjacent to the outer conductors. Of course it will be understood that the non-deformable member may be positioned in only one part of the two-part telescopic member, if desired.

Any desired method may be used for joining the inner conductors of the cables. Thus, for example, the inner conductors may be connected by means of solder or a crimp splicer or both and then insulated by means of a plastic sleeve which may be heat-recoverable or non-heat recoverable or tape. Alternatively, the inner conductors can be connected by means of a heat-shrinkable member, a quantity of solder, and an electrically conductive deformable member. Where, however, it is important to obtain a mechanically strong splice and/or a matched impedance splice the inner conductors are preferably electrically connected by making an electrical connection between each inner conductor and an inner elongate electrically conductive member.

When an inner elongate electrically conductive member is used to make an electrical connection between the inner conductors, this member preferably has a hollow portion at each end for receiving an inner conductor of the cable, and is advantageously hollow throughout its length. The electrical connection between a hollow inner elongate member and the inner conductors can be made in any desired way, for example by crimping.

Preferably, however, the connection is made by soldering, and in this case the inner elongate member advantageously has at least one opening in its side through which solder can be brought into contact with an inner conductor received in the member. The opening may be an aperture in the wall of the hollow member, said member being, except in the region of the aperture, closed in cross-section. Alternatively, however, the opening may be in the form of a longitudinal slit extending from one end of the inner elongate member to the other; in this case, the hollow member is preferably 'C'- or 'U'-shaped. If desired, both an aperture or apertures and a slit may be provided.

When the cable inner conductors received within a hollow inner elongate member are to be soldered to that member, hand soldering methods may, if desired, be used. Preferably, however, a heat-shrinkable sleeve having a quantity of solder therein is positioned around the hollow member and is so arranged that, when the assembly is heated to cause the sleeve to shrink and the solder to fuse, the molten solder flows through the opening(s) in the hollow member and electrically connects the inner conductors. The solder-containing heat-shrinkable sleeve is preferably preinstalled on the hollow member so that the sleeve and the hollow member can be installed on the inner conductors as a single unit.

If it is desired to obtain an impedance matched splice, the inner hollow elongate member may be generally cylindrical. The inner conductor splice made using a generally cylindrical member has a regular and constant configuration and, if the outer diameter of that member and the inner diameter of the substantially undeformable member used in joining the outer conductors are appropriately selected, makes possible the production of reproducible matched impedance splices. It should be understood that either the inner elongate hollow member, or the substantially undeformable member, or both, may have one or more changes (which may be stepwise) in dimensions along the length thereof if these changes are such that they do not affect to an unacceptable extent the characteristics of the splice.

In the splicing method of the invention, one or more spacers of an electrically insulating material are preferably provided for ensuring that the inner conductors, and the splice between them, are correctly located with respect to the electrical connection between the outer conductors. Where the construction of the cable permits (i.e. where there is no solid dielectric) the spacers may be shaped to extend into the outer conductors of the cables for a short distance. Preferably, however, the spacers are such that they do not have to be inserted in the outer conductors so that they can, if desired, be used with cables having a solid dielectric. The spacers may, for example, be discs, one disc advantageously being situated on either side of the splice in the inner conductors. Advantageously, however, two cap-shaped spacers, each of which has a radially extending portion and an axially extending portion, are used, each axially extending portion being capable of receiving the end portion of an outer conductor. At least one spacer may, if desired, be installed on the inner elongate member, or on a heat-shrinkable sleeve surrounding the inner elongate member, before the inner elongate member is positioned adjacent to the inner cable conductors.

When it is desirable to produce a good impedance match between the splice and the cables, the spacers preferably comprise a material having a dielectric constant as close as possible to the dielectric constant of the cable dielectric. Also, the spacers should not soften and become distorted on being heated. Materials which may be used for the spacers include polytetrafluoroethylene (possibly in a mouldable form) and the materials described in British patent specification Nos. 1,287,932 and 1,287,933 and Belgian Pat. Nos. 779,457, 779,458 and 779,459. For a good impedance match when using a two-part substantially undeformable member having telescoping second end portions, it is also important that the second end portion of each of the parts be of greater diameter than the first end portion and that the telescoped second end portions be correctly axially, as well as radially, located with regard to the splice in the inner conductors (i.e. the enlarged diameter portion of the substantially undeformable member should be substantially aligned with the inner conductor splice). In accordance with the invention, the desired axial location of the two parts of the substantially undeformable member may be obtained by cooperation between the spacers and stop means, for example a portion of reduced diameter, provided on each of the two parts.

In those heat-shrinkable sleeves used according to the method of the invention that contain a deformable member, the deformable member is advantageously in the form of a braid. The deformable member is advantageously impregnated with the solder and, if desired, flux. The heat-shrinkable member may also include an additional quantity of solder (in, for example, the form of a ring) positioned between the reinforcing member and the sleeve, the additional quantity of solder advantageously having a higher melting temperature than the rest of the solder. Where such a high-temperature solder is used, the assembly is heated until the high-temperature solder has fused. This ensures that the whole assembly, including the conductor positioned within the deformable member (which is shielded somewhat from the heat by the deformable member) reaches a high enough temperature for a good soldered connection to be made. Additional details on the method of construction of a heat-recoverable member and, where appropriate, a deformable member and the materials to be used in their manufacture, are given below. It should be noted that, although the heat-shrinkable member preferably comprises a polymeric material, it may instead comprise a heat-shrinkable metal; in the latter case the deformable member may be integral with the heat-shrinkable member.

When a heat-shrinkable member containing solder but no deformable member is used (for example in making the inner conductor splice), the solder is preferably in the form of a ring; such a ring of solder advantageously has a core of flux. If desired, a quantity, preferably a ring, of a fusible material may be provided on each side of the solder; the fusible material, which may be, for example, a polymeric material such as a thermoplastic polymer, a hot-melt adhesive or the like, acts as a dam for the molten solder, preventing it from escaping from the sleeve. The sleeve is advantageously transparent so that the soldered connection can be inspected. Solder-containing heat-recoverable sleeves are described in British patent specification No. 1,062,043.

When cables are to be joined by the method of the invention, each is stripped to expose a portion of the inner conductor and a portion of the outer conductor, and the two inner conductors, and the two outer conductors, are spliced. If the means for connecting the outer conductors comprises a substantially undeformable member having an aperture therein, the various components may, if desired, be installed as a one-piece connector, and the inner conductor splice may be made before, after, or at the same time as, the outer conductor splice. Otherwise, however, it is normally necessary to slip the components for making the outer conductor splice (and, if desired, one or more spacers) over one of the outer conductors before making the inner conductor splice and only to move these components into their final position when the inner conductor splice has been made.

The cables joined by the method of the invention may be coaxial cables having a center conductor and an outer conductor. If desired, at least one of the cables may have a substantially continuous solid dielectric. The outer conductor of at least one of the cables may be rigid, in which case the outer conductor may be with or without a longitudinal seam. The method may also be used for cables with a flexible outer conductor, or for connecting a cable with a flexible outer conductor to one with a rigid outer conductor. The cables joined may, if desired, be of different sizes. It should be understood that at least one of the cables used in the method of the invention may be replaced by any other electrical component which comprises an inner conductor electrically insulated from an outer conductor.

The method of the invention thus makes possible the quick and easy connection of two cables or other electrical components. In some cases, only two parts are required, in contrast to previously proposed methods that use a large number of parts. The method can give a mechanically strong splice and, when the dimensions of the parts are correctly chosen (which may be done without difficulty by those skilled in the art), the impedance of the splice may be essentially the same as that of the cables.

The present invention also provides a heat-recoverable article which comprises a hollow heat-recoverable member, which member has at least one open end, and an insert abutting, and positioned within the direction of recovery of, the heat-recoverable member, the insert comprising a quantity of solder and a deformable member, which deformable member is infusible at the temperature to which the assembly is heated to cause the heat-recoverable member to recover and the solder to fuse, and being such that, at that temperature, it can be deformed by the force exerted by the heat-recoverable member. Particularly when the deformable member is electrically conductive, this article can be used in the splicing method of the invention. Whether or not the deformable member is electrically conductive, however, the article has uses other than in connection with the splicing method of the invention. Some of the possible uses are indicated below.

The heat-recoverable member in the article of the invention is preferably independently dimensionally heat-unstable. If desired, however, the heat-recoverable member may, at room temperature, be maintained in the heat-unstable state by the insert. In the latter case, the solder may be replaced by a different fusible material. The heat-recoverable member may comprise any material to which the property of heat-recoverability may be imparted, and is advantageously a polymeric material that has been crosslinked by chemical means or by irradiation. Suitable polymeric materials include those described in British patent specification Nos. 990,235 and 1,010,064 and, in particular, include polyethylene, polybutene, various copolymers of ethylene, propylene and butene, polyvinyl halides, for example polyvinyl chloride, polyacrylates, polyamides, for example Nylon 6 or Nylon 66, polyesters, for example polyethylene terephthalate, vinylidene fluoride polymers, for example polyvinylidene fluoride, vinylidene fluoride-hexafluoropropene copolymers, and vinylidene fluoride-chlorotrifluoroethylene copolymers and materials with similar electrical properties (for example dielectric constant) to any of the foregoing materials. It is to be understood that any of these polymeric materials may be used to form the heat-recoverable member used in the splicing method of the invention.

The deformable member in the article of the invention may comprise, for example, a plurality of parallel wires or strips held together, if desired, by solder. It is preferably, however, in the form of a tube of braid which can be expanded and contracted in a direction substantially normal to its longitudinal axis. The braid may comprise metal fibres or fibres of an electrically insulating material, for example, glass. If the metal fibres forming the braid comprise, for example, tin-plated-copper-clad steel, the braid may provide integral cross-talk shielding in a cable splice; in a cable splice using braid of this kind, the inner elongate member could comprise a steel/copper laminate.

Advantageously, the deformable member in the article of the invention is impregnated with the solder. Such a deformable member can be made, for example, by immersing the deformable member in molten solder (and, if desired, flux), allowing the solder to solidify, and inserting the tinned deformable member in a heat-recoverable sleeve. Whether or not the deformable member is impregnated with the solder, the sleeve is advantageously partially recovered into contact with the deformable member (and the solder) so that these are held firmly by the sleeve; for this, the deformable member may be supported on a mandrel and heating is effected in such a way that the solder does not melt.

The articles of the invention have a number of advantages in addition to those already mentioned in connection with the splicing method. Thus, the solder may prevent unravelling of the deformable member (especially when the latter is a braid) and a metallic deformable member only loses its strength (for example collapses) and allows the heat-recoverable sleeve to recover when the entire deformable member has reached the soldering temperature. Moreover, an electrically conductive deformable member may make it possible to obtain an effective soldered connection with the use of less heat than when the member is absent. In some cases the deformable member may shield the substrate from heat and/or may reduce the risk of solder penetrating through the seam which can be present in the outer conductors of rigid coaxial cables.

As indicated above in connection with the splicing member of the invention, however, the most important advantage of the article of the invention is that the deformable member can, like the heat-recoverable sleeve, accommodate itself to the shape of the substrate(s) to which it is applied. This means that the article can be used, for example, to connect substrates of different sizes and to provide reinforcement of the connection and, where the substrates and the reinforcing member are electrically conductive, electrical continuity between the substrates. Thus, although the article of the invention is particularly useful in the splicing method of the invention, it may also be used in many other ways, for example to provide a reliable soldered connection between two wave guides or two tubes of substantially different diameters.

The invention therefore also provides a method of joining a pair of substrates which comprises positioning each substrate, or a portion thereof, within a heat-shrinkable article constructed in accordance with the invention, and heating the article to cause the heat-shrinkable member to shrink, the solder to fuse, and the deformable member to be deformed by the force exerted by the heat-shrinkable member. The substrates may be elongate members, the cross-sectional area of one of which differs from that of the other.

The invention will now be described, by way of example only, with reference to the accompanying drawings, in which:

FIG. 4 shows a splice between two coaxial cables made using the components shown in FIGS. 1 to 3;

FIG. 9 is a section through a further braid-containing heat-shrinkable sleeve;

FIG. 10 is a section through a further assembly that may be used for joining the center conductors of two coaxial cables;

FIGS. 13 and 14 show a substantially undeformable member with integral deformable end portions and a splice made using such a member;

FIG. 15 shows a splice made using an electrically insulating undeformable member;

The figures are not drawn to scale, so that certain parts thereof can be shown more clearly.

Figure 1:
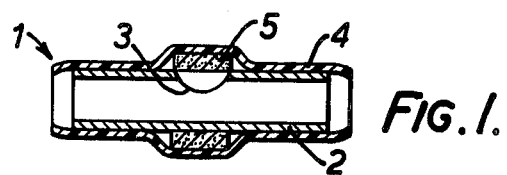
FIG. 1 is a section through an assembly which may be used for connecting two center conductors of a coaxial cable.

Referring now to the drawings, FIG. 1 shows an assembly which is generally indicated by the reference numeral 1 and comprises a metal tube 2 having an aperture 3 therein, and a sleeve 4 of heat-shrinkable insulating material surrounding the tube 2. The sleeve 4 has a ring of solder 5 therein, the solder 5 being positioned in line with the aperture 3. The assembly 1 may be used for joining the center conductors of two coaxial cables.

Figure 2:
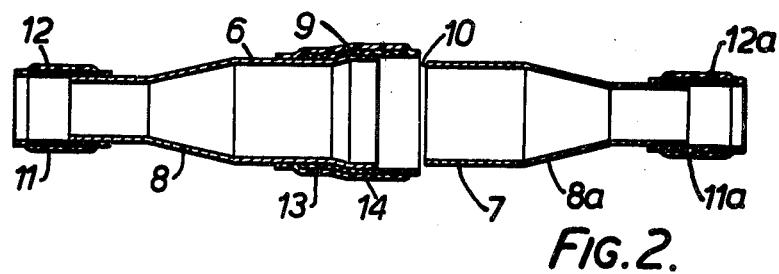
FIG. 2 shows, in section, a two-part elongate hollow member provided with braid-containing heat-shrinkable sleeves.

FIG. 2 shows a device which may be used for connecting the outer conductors of two coaxial cables. The device comprises a left-hand shield part 6 and right-hand shield part 7, each of the shield parts 6 and 7 having one cylindrical end portion of relatively small diameter for contacting the outer conductor of the respective coaxial cable and one cylindrical end portion of relatively large diameter for contacting the other shield part. In each case, the large and small diameter end portions are joined by a tapering portion 8 and 8a respectively. The large diameter (right-hand) end portion of the left-hand shield part 6 is enlarged at its open end 9 so that the open end 10 of the right-hand part 7 can be telescopically received therein. Each of the shield parts 6 and 7 is provided at its smaller end with a heat-shrinkable sleeve, 11 and 11a respectively, having a tube of pretinned, prefluxed metallic braid, 12, 12a therein, and the part 6 is also provided at its larger end with a heat-shrinkable sleeve 13 having a length of pretinned, prefluxed metallic braid 14 therein.

Figure 3:
FIG. 3 is a side view of an insulating spacer.

FIG. 3 shows an insulating spacer 15 that may be used in a splice made in accordance with the invention. The spacer is preferably made of polytetrafluoroethylene. The spacer is provided with a radial slit so that it can, if twisted slightly, be installed on a center conductor whose end is not readily accessible.

A splice between two coaxial cables made using the components illustrated in FIGS. 1 to 3 is shown in FIG. 4. The two cables, 16 and 16a, are identical and each comprises outer insulation (not shown), an outer conductor 17, 17a, a center conductor, 18, 18a, and a plurality of spacers (not shown) of an electrically insulating material. When a splice is made between the cables, each is stripped to expose the center conductor and the outer conductor. The shield part 6, with its associated solder-containing sleeves, is then slipped over the outer conductor 17 of the cable 16 and, similarly, the shield part 7 is slipped over the outer conductor 17a of the cable 16a. An insulating spacer 15, 15a is slipped over each center conductor so that it abuts the corresponding outer conductor. The center conductors 18, 18a are then inserted in the tube 2 of the assembly 1 and heat is applied to shrink the sleeve 4 and melt the solder 5. After cooling, a firm, insulated, electrical connection between the two conductors is obtained.

Next, the two shield parts 6 and 7 are moved towards each other until further axial movement is prevented by the spacers 15 and 15a (which just fit in the large diameter end portions of the parts 6 and 7) contacting the tapering portions 8 and 8a. The dimensions of the various parts and the length of the center conductor splice are so chosen that, when axial movement of the two shield parts is no longer possible, the open end 10 of the right-hand part is received within the enlarged diameter open end 9 of the left-hand part 6. Heat is then applied to the heat-recoverable sleeves 11, 11a and 13 to cause the sleeves and tinned braids 12, 12a, 14 to shrink and the solder to melt, thus giving a mechanically strong electrical connection between the left-hand shield part 6 and the outer conductor 17, between the right-hand shield part 7 and the outer conductor 17a and between the two shield parts 6 and 7.

Figure 5:
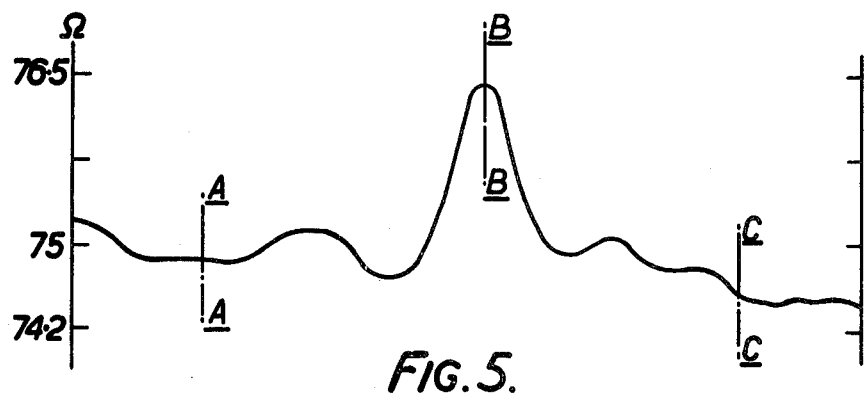
FIG. 5 is a time domain reflectometer display of a splice as shown in FIG. 4.

FIG. 5, which shows a time domain reflectometer display for a typical splice made as described with reference to FIGS. 1 to 4, clearly demonstrates that the maximum impedance of the splice (B—B) is substantially the same as the impedance of the coaxial cables themselves (A—A and C—C).

Figure 6:
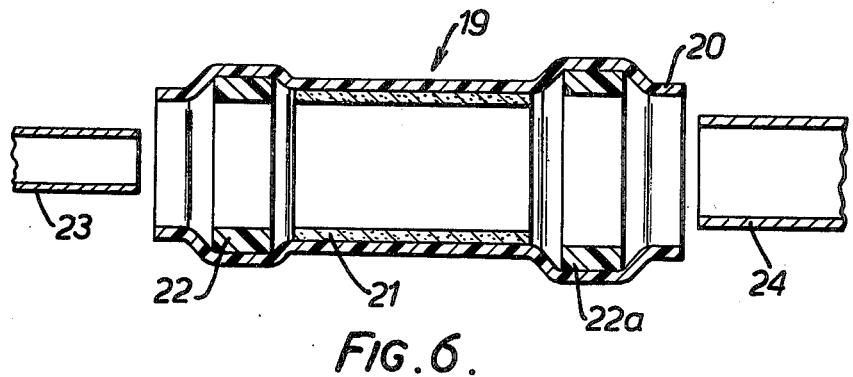
FIGS. 6 to 8 show a braid-containing heat-shrinkable sleeve and the use of such a sleeve to join two tubular members of different diameters.

A heat-shrinkable sleeve containing a length of pretinned, prefluxed electrically conductive braid is shown in FIG. 6. The sleeve, which is generally indicated by the reference numeral 19, comprises a heat-shrinkable outer sleeve 20 containing a length of pretinned, prefluxed braid or shield 21 and two fusible rings of thermoplastic material or a hot-melt adhesive or other suitable material, 22 and 22a. The thermoplastic material 22 and 22a may if desired be omitted.

Figure 7:
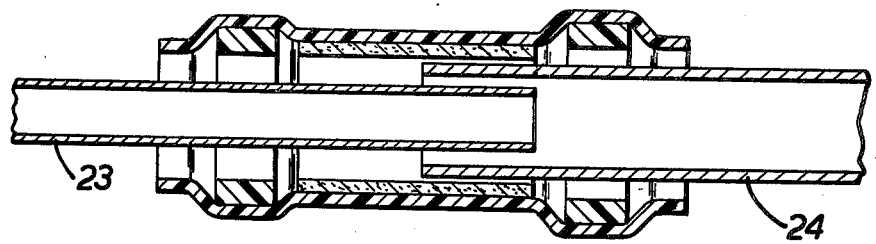
Figure 8:
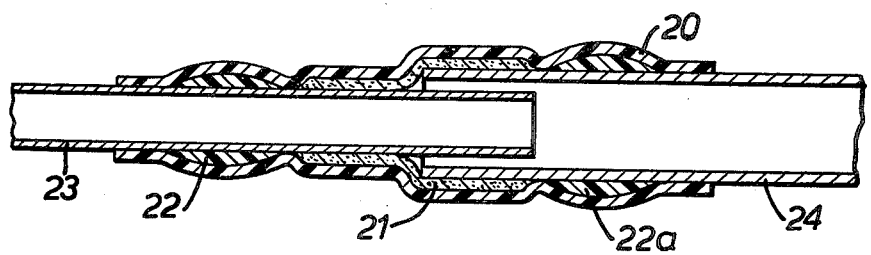

Although the sleeve shown in FIG. 6 may be used with advantage in the splicing method described with reference to FIGS. 1 to 4, it may also be used for connecting other substrates. Thus, for example, the sleeve 20 may be used for connecting two tubular members of different diameter such as those indicated by the reference numerals 23 and 24 in FIG. 6. When a joint is to be made between tubular members 23 and 24, they are positioned within sleeve 19 as shown in FIG. 7 and the sleeve 19 is heated to give the mechanically strong soldered connection shown in FIG. 8.

An alternative form of heat-shrinkable sleeve containing a reinforcing deformable member is shown in FIG. 9. The sleeve shown in FIG. 9, which is generally indicated by the reference numeral 25, includes, as does the sleeve of FIG. 6, a heat-shrinkable outer sleeve 20 and a length of solder-impregnated braid 21. The sleeve 25 also includes a ring 26 of solder positioned between the heat-shrinkable sleeve 20, which is transparent, and the solder-impregnated braid 21. The ring 26 comprises solder of a higher melting point than the solder with which the braid is impregnated. When the sleeve 25 is installed around a substrate, it is heated until the ring 26 of solder fuses to ensure that the entire assembly reaches a high enough temperature for effective soldering to occur. The sleeve of FIG. 9 may, of course, be used instead of any of the braid-containing sleeves illustrated in FIGS. 2, 4 and 6 to 8.

FIG. 10 illustrates an assembly which may be used instead of the assembly of FIG. 1 electrically to connect the center conductors of two coaxial cables. The assembly of FIG. 10, which is generally indicated by the reference numeral 27, comprises metal tube 28, made, for example, of brass, having a longitudinal slit 29 therein. A sleeve 30 of heat-shrinkable electrically insulating material surrounds the tube 28, and two rings of solder, 31 and 31a, are positioned between the sleeve 30 and the tube 28. A cap-shaped spacer, 32 and 32a respectively, is mounted on each end of the sleeve 30, the axially extending portions 33 and 33a of the spacers extending outwardly from the assembly to receive the outer conductor of a coaxial cable. Of course, the spacers could be supplied separately, and either the assembly 27, or that assembly without the spacers, or the spacers, could be used (instead of the corresponding parts illustrated in FIGS. 1 and 3) in conjunction with the device of FIG. 2.

Figure 11:
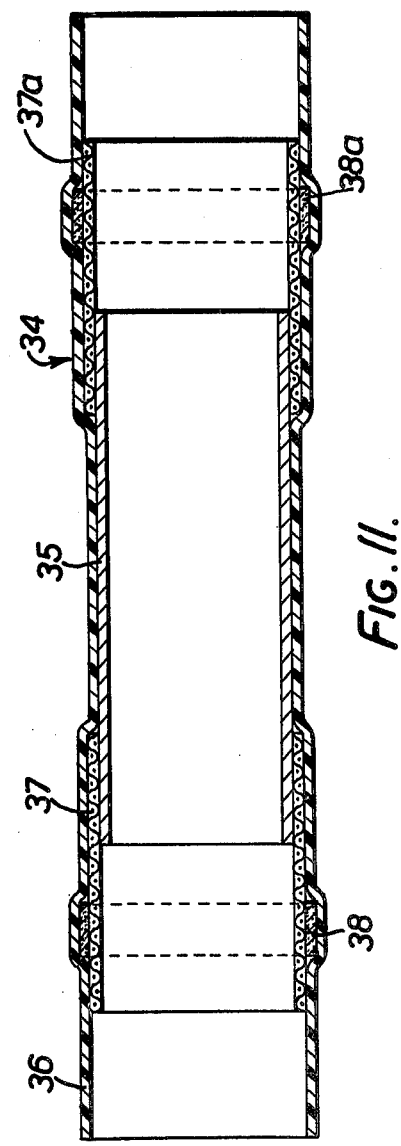
FIG. 11 is a section through an assembly that may be used for joining the outer conductors of two coaxial cables.

FIG. 11 illustrates an assembly that may be used for joining the outer conductors or two coaxial cables. The assembly may be used in conjunction with any method of joining the inner conductors; preferably, however, one of the methods described with reference to FIGS. 1, 2 and 10 is used. The assembly illustrated in FIG. 11, which is generally indicated by the reference numeral 34, comprises a metal tube 35 of, for example, brass, and surrounding the metal tube 35, a sleeve 36 of transparent heat-shrinkable electrically insulating material. The sleeve 36 extends beyond both ends of the tube 35. The sleeve 36 contains two lengths, 37 and 37a respectively, of solder-impregnated metal braid. Each length of braid is, throughout its length, in contact with the heat-shrinkable sleeve 36 and, for part of its length, is also in contact with the metal tube 35; that is, part of each length of braid extends beyond the end of the tube 35, the remainder being positioned between the tube 35 and the sleeve 36. Between each length of braid and the sleeve 36 is positioned a ring 38, 38a of high-temperature solder, the function of which is explained above in connection with the sleeve of FIG. 9.

Figure 12:
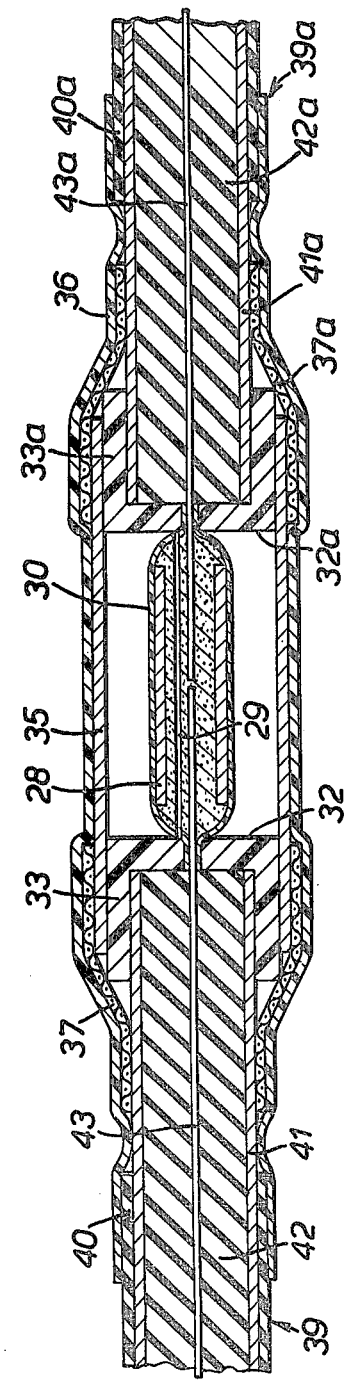
FIG. 12 shows a splice between two coaxial cables made using the components shown in FIGS. 10 and 11.

A splice between two coaxial cables made using the components illustrated in FIGS. 10 and 11 is shown in FIG. 12. The two cables, 39 and 39a are identical and each comprises outer cable insulation 40, 40a, an outer conductor 41, 41a, a solid dielectric 42, 42a, and a center conductor 43, 43a. When the splice is made, each cable is stripped to expose a portion of the center conductor and a portion of the outer conductor. The assembly of FIG. 11 is then slipped over the outer insulation of one of the cables, and the center conductors 43 and 43a are inserted in the metal tube 28 of the assembly of FIG. 10, heat being applied to shrink the sleeve 30 and fuse the solder rings 31 and 31a. Next, the assembly 34 is moved into position over the splice in the inner conductors and is heated to cause the sleeve 36 to shrink and to cause the solder rings 38 and 38a and the solder of the impregnated braids 37 and 37a to fuse. The sleeve and the braid shrink, with the result that a mechanically strong electrical connection is made between the metal sleeve 35 and each of the outer conductors of the cables, despite the fact that, as can be seen from FIG. 12, the sleeve 35 is not in direct contact with the outer conductors 41 and 41a.

FIG. 13 shows a substantially undeformable electrically conductive member 44 having integral deformable end portions 45 and 45a. The member 44 is generally cylindrical and each of the end portions comprises a plurality of parallel prongs. As can be seen from FIG. 14, a heat-shrinkable sleeve can deform the end portions 45 and 45a so that they come into contact with the substrates to be joined, in this case the outer conductors of two coaxial cables; a quantity of solder (not shown) in each of heat-shrinkable sleeve 46 fuses when sleeve 46 is shrunk and ensures that a good electrical connection is made between each of the deformable end portions and the respective outer conductor.

The splice in the inner conductors in FIG. 14 is shown in a purely diagrammatic fashion to indicate that any desired splicing method may be used. The same is true of the cable splice shown in FIG. 15. In FIG. 15, the connection between the outer conductors of the cable is made by means of a heat-shrinkable sleeve 47 containing a length of solder-impregnated braid 48; the braid 48 extends for substantially the entire length of the sleeve 47. The center portion of the sleeve 47 and of the braid 48 are shrunk round a rigid sleeve 49 of electrically insulating material which is positioned around the splice in the inner conductors, while at each end the braid is forced by the sleeve into contact with the respective outer conductor. The sleeve 49 thus maintains the braid at a desired distance from the splice in the inner conductors. The sleeve 49 could, if desired, be replaced by a moulded part 50 (without braid 51) shown in FIGS. 16 and 17.

Figure 16:
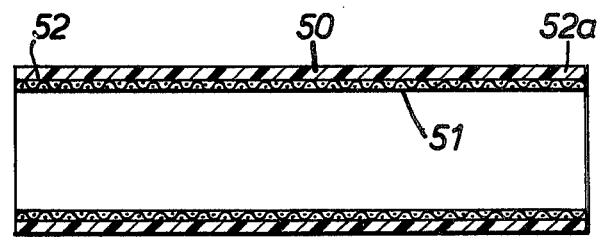
FIGS. 16 and 17 show a heat-recoverable member and deformable member according to the invention.
Figure 17:
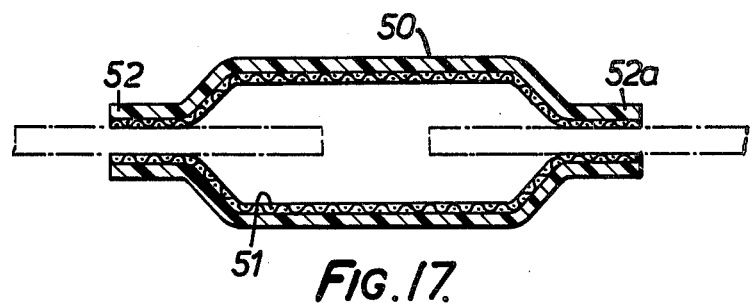

FIGS. 16 and 17 show a moulded part 50 having a length of braid 51 bonded to the interior thereof. In its heat-recoverable form, the part 50 is generally cylindrical in shape, but the end portions 52 and 52a can recover on heating to give a configuration in which the end portions of the part have a smaller diameter than the central portion.

Figure 18:
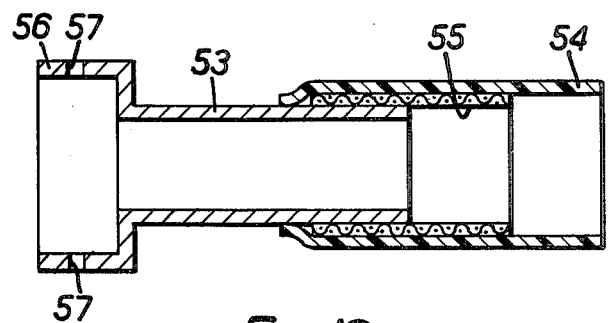
FIG. 18 shows a further substantially undeformable member that may be used in the method of the invention.

The substantially undeformable member 53 shown in FIG. 18 is electrically conductive and is provided at one end with a heat-shrinkable sleeve 54 containing a length of solder-impregnated metallic braid 55. At the other end, the member 53 has an enlarged diameter portion 56 shaped to receive an outer conductor of a cable. The portion 56 is provided with a plurality of apertures 57 through which a connection can be made, for example by shrinking a heat-recoverable sleeve containing solder around portion 56. Of course, it is not essential that portion 56 should have a larger diameter than the remainder of member 53; the choice of diameter for end portion 56 will depend on the size of the conductor that is to be received in the end portion.

Figure 19:
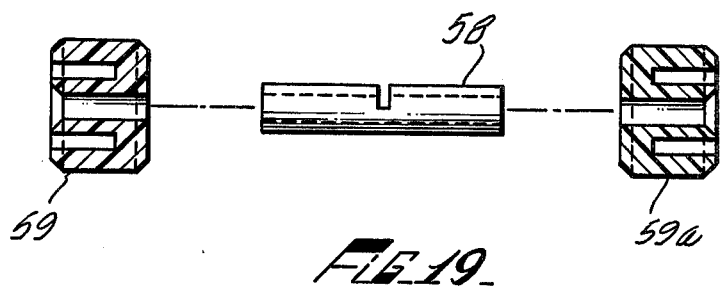
FIGS. 19-20 show an assembly according to the present invention useful for making connection between coaxial cables.
Figure 20:
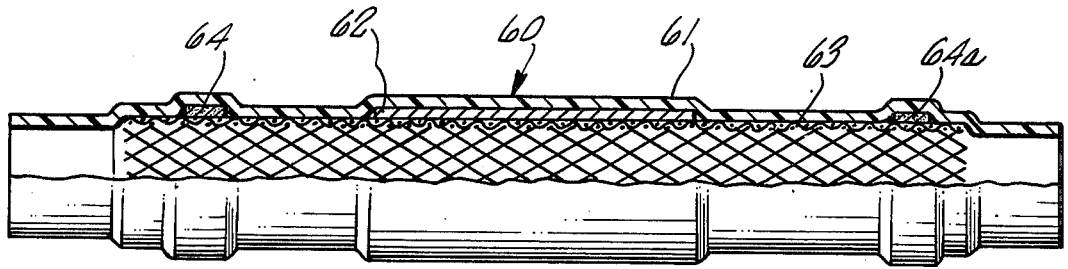

FIGS. 19 and 20 illustrate a presently preferred assembly for joining coaxial cable. The members shown in FIG. 19 are, respectively, a crimp splicer 58 for joining the inner conductors of the coaxial cable and cap spacers 59 and 59a similar to spacers 32 and 32a of FIG. 10.

The inner conductors are joined using crimp splicer 58 over which a heat shrinkable sleeve, not shown but like sleeve 30 of FIG. 10, is shrunk. If desired, the sleeve may be coated with a hot melt adhesive to seal the ends of the sleeve. Spacers 59 and 59a are positioned like spacers 32 and 32a of FIG. 10 to receive the outer conductors of the cable as shown in FIG. 12. The outer conductors are joined using the assembly of FIG. 20.

The assembly of FIG. 20 is similar to that of FIG. 11. It is particularly suited for joining the outer conductors of coaxial cable when it is critical that a matched impedance splice be obtained. Of course, it need not be used exclusively with the assembly of FIG. 19.

In FIG. 20, the assembly generally indicated by reference numeral 60 comprises heat-recoverable sleeve 61 of a suitable, preferably transparent, heat-shrinkable electrically insulating material. Disposed within, and surrounded by, sleeve 61 is metal tube 62 as a non-deformable member. Disposed within tube 62 is a length of tubular metal braid 63 that is solder impregnated. It is in this latter respect that the assembly of FIG. 20 differs most from that of FIG. 11 in which the metal tube is disposed within two lengths of braid. Near either end of the assembly 60, a ring 64 or 64a of high-temperature solder is disposed between the portion of the braid extending from tube 62, i.e., the deformable portion of the braid, and heat-recoverable sleeve 61. The function of these solder rings is explained in the description of FIG. 9.

A splice between outer conductors in coaxial cable is made in a manner similar to that for making the splice described in connection with FIGS. 10-12. As indicated above, the assembly of FIG. 20 is preferred for making splices when a matched impedance is important as it is easier to make and handle.

We claim:
1. A connector useful for electrically connecting electrical conductors comprising:
 a hollow heat-recoverable member having open ends;
 a quantity of solder within the hollow heat-recoverable member; and
 a deformable member comprising a metallic braid within the hollow heat-recoverable member, the deformable member comprising electrically conductive material and being infusible at the temperature to which, in use, the connector is heated to cause the heat-recoverable member to recover and the solder to fuse, the deformable member being such that, at the temperature to which it is brought by said heating, it is deformed by the force exerted by the heat-recoverable member upon recovery.

2. A connector of claim 1 wherein the solder is impregnated in the braid.

3. A connector of claim 2 wherein the braid is a tubular member.

4. A connector of claim 3 wherein the hollow heat-recoverable member is a sleeve.

5. A connector of claim 2 further comprising at least one ring of solder having a higher melting point than the solder impregnated in the braid, said solder ring being positioned between the braid and the heat-recoverable member.

6. A connector of claim 5 comprising two solder rings having a higher melting point than the solder impregnated in the braid.

7. A connector of claim 1 which further comprises two rings of fusible thermoplastic material within the heat-recoverable member, each ring being positioned between and end of the deformable member and a respective open end of the heat-recoverable member.

8. A cable connector for electrically connecting coaxial cables having inner and outer coaxially arranged conductors comprising:
 an outer electrically conductive shell having two open ends, a heat-recoverable member being positioned over at least part of the shell, the heat-recoverable member containing a quantity of solder, at least one of the ends of the outer shell being deformable by the force exerted by the heat-recoverable member at the temperature to which, in use, the connector is heated to cause the heat-recoverable member to recover and the solder to fuse, said end being infusible at that temperature; and
 means for making an electrical connection between the inner conductors of the cables.

9. A connector of claim 8 wherein the means for making an electrical connection between the inner conductors comprises an electrically conductive inner tube.

10. A connector of claim 9 wherein the inner tube is a crimp connector.

11. A connector of claim 9 which also comprises a heat-recoverable member for positioning over the electrically conductive inner tube.

12. A connector of claim 8 wherein the means for making an electrical connection between the inner conductors comprises an inner elongate electrically conductive member and an inner heat-recoverable member positioned over the inner elongate member, the inner heat-recoverable member also containing a quantity of solder.

13. A connector of claim 12 wherein the inner elongate member is a hollow tube having an aperture therein, the arrangement being such that on heating the solder melts and the inner heat-recoverable member recovers and exerts an inward force on the melted solder, causing it to flow through the aperture to form an electrical connection between the inner cable conductors.

14. A connector of claim 13 wherein the aperture is a slit in the hollow tube.

15. A connector of claim 14 wherein the aperture is a longitudinal slit in the hollow tube.

16. A connector of claim 12 wherein cap-shaped spacers of electrically insulating material are mounted on the means for making an electrical connection between the inner conductors, the spacers being adapted to maintain the said means at a predetermined distance from the outer shell.

17. A connector of claim 8, wherein at least one of the ends of the outer shell comprises a metallic braid impregnated with solder.

18. A connector of claim 17 which also comprises one or more rings of solder positioned within the heat-recoverable member.

19. A connector of claim 17 which also comprises one or more rings of solder positioned between the braid and the heat-recoverable member.

20. A connector of claim 8 wherein cap-shaped spacers of electrically insulating material are provided for maintaining the outer shell at a predetermined distance from the means for making an electrical connection between the inner conductors.

21. A connector of claim 8 wherein a portion of the outer shell is essentially non-deformable by the force exerted by the heat-recoverable member when the connector is heated to cause the heat-recoverable member to recover and the solder to fuse.

22. A connector of claim 21 wherein the outer shell comprises a metallic sleeve having two open-ends, the sleeve being essentially non-deformable by the force exerted by the heat-recoverable member when the connector is heated to cause the heat-recoverable member to recover and the solder to fuse, and at least one end of the shell comprises solder-impregnated metallic braid.

23. A connector of claim 21 wherein the outer shell comprises a metallic sleeve having two open-ends, the sleeve being essentially non-deformable by the force exerted by the heat-recoverable member when the connector is heated to cause the heat-recoverable member to recover and the solder to fuse, and a length of solder-impregnated metallic braid disposed within said metallic sleeve, the ends of said braid extending beyond the ends of said sleeve.

24. A connector of claim 21 wherein the outer shell comprises two parts capable of being telescoped together.

25. A cable connector for electrically connecting coaxial cables having coaxially arranged inner and outer conductors comprising:
means for making and insulating an electrical connection between the inner conductors of the cables;
an outer electrically conductive shell having two open ends, said ends comprising a deformable and electrically conductive material having in contact therewith a quantity of solder and having thereover a heat-recoverable member such that upon heating, the solder fuses and the heat-recoverable member exerts an inward force upon the deformable electrically conductive ends of the outer shell, said ends being infusible at that temperature.

26. A cable connector according to claim 25 wherein the means for making an electrical connection between the inner conductors of the cable comprises a crimp connector.

27. A cable connector according to claim 26 wherein the insulating means for said electrical connection is insulating tape.

28. A cable connector according to claim 26 wherein said insulating means is a heat shrinkable tube.

29. A cable connector according to claim 25 wherein said means for making and insulating an electrical connection between the inner conductors comprises a tube having an aperture therein, solder thereon and a heat shrinkable member thereover such that upon heating, the solder melts and the heat shrinkable member exerts an inward force on the tube and the melted solder causing the solder to flow through the aperture to electrically connect the inner cable conductors.

30. A connector according to claim 29 wherein the aperture is a slit in the tube.

31. A connector according to claim 29 wherein the tube with an aperture is electrically insulating.

32. A connector according to claim 29 wherein the tube having an aperture is electrically conductive.

33. A connector according to claim 29 wherein the tube having an aperture is undeformable by the shrinking force of the heat shrinkable member.

34. A connector according to claim 29 wherein means are provided to space uniformly apart the tube having the aperture therein and the outer conductive shell.

35. A connector of claim 25 wherein the outer electrically conductive shell is a tube of metallic braid having solder impregnated therein.

36. A connector of claim 25 wherein the center portion of the outer electrically conductive shell is essentially non-deformable under the force exerted by the shrinkage of the heat shrinkable member thereover.

37. A connector according to claim 36 wherein the outer electrically conductive shell comprises two parts, each part comprising a first end portion for receiving the outer conductor of a cable which end portion is deformable under the recovery forces exerted by the recovery of a heat-shrinkable member thereover and a second end portion, at least one part comprising a second end portion which is non-deformable under the forces exerted by the recovery of the heat-recoverable member thereover, the second end portions being capable of being telescoped together.

38. A connector according to claim 25 wherein the outer electrically conductive shell comprises an electrically conductive tube non-deformable by the shrinking of the heat shrinkable tube positioned thereover having at either end a length of solder impregnated metallic braid.

39. A connector according to claim 25 wherein the outer electrically conductive shell comprises an electrically conductive tube non-deformable by the shrinking of the heat shrinkable tube positioned thereover having a length of tubular solder impregnated metallic braid disposed within and extending beyond either end of the non-deformable tube.

40. A connector according to claim 25 wherein the outer electrically conductive shell comprises an electrically conductive tube non-deformable by the shrinking of the heat shrinkable tube positioned thereover having a length of solder impregnated metallic braid disposed without and extending beyond the ends of the non-deformable tube.

41. A method of electrically connecting two cables, each of which comprises an inner conductor and an outer conductor, which method comprises:
electrically connecting and insulating the inner conductors of the cables;
inserting the outer conductors of the cables into a deformable electrically conductive member having two open ends, said deformable electrically conductive member having in contact therewith a quantity of solder;
positioning over said deformable member a hollow heat-shrinkable member having two open ends;
and heating the heat-shrinkable member such that the solder melts and the heat-shrinkable member exerts an inward force upon the deformable electrically conductive member causing the deformable member to be deformed against the outer cable conductors and be soldered thereto.

42. A method according to claim 41 wherein the inner conductors are connected by crimping.

43. A method according to claim 41 comprising the step of fabricating the deformable member from a metallic braid.

44. A method according to claim 43 comprising the step of impregnating the metallic braid with solder.

45. A method according to claim 41 wherein the inner conductor of each cable is inserted into a tube having an aperture therein and solder thereon, positioning a heat shrinkable member over the inner tube and heating the heat shrinkable member and the solder such that the solder melts and the heat shrinkable member exerts on inward force on the tube and the solder causing the solder to flow through the aperture and electrically connect the inner cable conductors.

46. A process according to claim 45 comprising the step of forming the aperture in the inner tube as a slit.

47. The method of claim 41 comprising positioning means between the connection of the inner conductors and the outer conductors to uniformly space the connection between the inner conductors and the connection between the outer conductors at a predetermined distance from each other.

48. The method of claim 41 comprising the steps of fabricating the deformable member from a metallic braid having solder impregnated therein, positioning said braid within a non-deformable electrically conducting hollow member having two open ends so that the ends of said braid extend beyond the ends of said non-deformable member.

49. A method according to claim 41 comprising the steps of fabricating the deformable member as two lengths of hollow metallic braid having solder impregnated therein, and positioning said lengths of braid over opposite ends of a non-deformable electrically conductive member having two open ends.

50. A method according to claim 41 comprising positioning a pair of rings of fusible thermoplastic material between the deformable member and a respective open end of the heat-shrinkable member.

51. A method according to claim 41 comprising positioning at least one ring of solder having a higher melting point than the soldering contact with the deformable member between the deformable member and a heat-shrinkable member.

52. A method according to claim 51 which comprises positioning two solder rings having a higher melting point than the solder in contact with the deformable member between the deformable member and the heat-shrinkable member.

53. A method of electrically connecting two cables, each of which comprises an inner conductor and an outer conductor, which method comprises:
inserting the inner conductor of each of the cables into an inner electrically conductive member; electrically connecting the inner conductors;
inserting the outer conductors of the cables into an outer electrically conductive shell having two open ends, said ends comprising a deformable electrically conductive member having in contact therewith a quantity of solder and having thereover an outer heat-recoverable member;
and, heating the outer heat-recoverable member such that the solder melts and the heat-recoverable member exerts an inward force upon the deformable electrically conductive ends of the shell causing the ends to be deformed against the outer cable conductor and be soldered thereto.

54. The method of claim 53 wherein the inner member is a crimp connector and the inner conductors are electrically connected by crimping.

55. The method of claim 54 which also comprises electrically insulating the crimped connection by heat recovering about it a heat recoverable electrically insulating member.

56. The method of claim 55 wherein the heating of said inner and outer heat-recoverable members is accomplished in a single heating step.

57. The method of claim 53 wherein the inner member is a hollow tube having an aperture therein and provided with an inner heat recoverable member positioned thereover, the inner heat recoverable member also containing a quantity of solder and wherein the inner conductors are electrically connected by heating the inner heat recoverable member to cause it to recover and the solder to melt such that recovery of the inner heat recoverable member exerts an inward force on the melted solder causing it to flow through the aperture to form an electrical connection between the inner cable conductors.

58. The method of claim 57 comprising forming the aperture as a slit in the hollow tube.

59. The method of claim 57 wherein the inner member is non-deformable by the recovery forces of the inner heat recoverable member.

60. The method of claim 57 wherein the heating of said inner and outer heat-recoverable members is accomplished in a single heating step.

61. The method of claim 53 wherein the ends of the outer electrically conductive shell comprise a metallic braid having solder impregnated therein.

62. The method of claim 61 wherein the center portion of the outer electrically conductive shell is essentially non-deformable under the forces exerted by recovery of the outer heat-recoverable member thereover.

63. The method of claim 62 wherein the deformable end portions are of different size and the connected cables are of different dimensions.

64. The method of claim 61 comprising positioning at least one ring of solder having a higher melting point than the solder-impregnated braid between the braid and the heat-recoverable member.

65. The method of claim 53 comprising positioning a tube of metallic braid having solder impregnated therein within a metallic tube which is non-deformable by the recovery forces of the outer heat-recoverable sleeve to form said outer electrically conductive shell, the arrangement being such that at least one end of the metallic braid protrudes beyond an end of the non-deformable metallic tube.

66. The method of claim 53 comprising positioning two rings of fusible thermoplastic material between an end of the deformable member and a respective open end of the heat-recoverable member.

67. The method of claim 53 comprising positioning the inner member and the outer conductive shell to be uniformly spaced from each other.

68. The method of claim 67 comprising positioning cap-shaped spacers of electrically insulating material to maintain the outer shell at a predetermined distance from the inner member.

69. The method of claim 53 wherein the outer conductive shell comprises two parts, each part comprising a first deformable end portion for receiving the outer conductors of one of the cables and a second end portion for positioning in telescopic relationship with the second end portion of the other part, at least one second end part being non-deformable under the recovery forces of the outer heat recoverable member.

70. A cable connection between a pair of coaxial cables comprising:
- an inner tube having an aperture therein, solder thereon and a first heat-recovered member thereover, said inner tube having connected therein the inner conductors of the coaxial cable pair;
- an outer electrically conductive shell over the outer conductors of the coaxial cable pair, said shell having two open ends, said ends comprised of a deformable electrically conductive material having in contact therewith a quantity of solder, having thereover a second heat-recovered member, the second heat recovered member having pressed the deformable electrically conductive ends of the outer shell into contact with the outer conductors.

71. A cable connection between a pair of co-axial cables comprising:
- an inner tube and a first heat-recovered member, said inner tube having crimp-connected therein the inner conductors of the coaxial cable pair;
- an outer electrically conductive shell over the outer conductors of the coaxial cable pair, said shell having two open ends, said ends comprised of a deformable electrically conductive material having in contact therewith a quantity of solder, having thereover a second heat-recovered member, the second heat-recovered member having pressed the deformable electrically conductive ends of the outer shell into contact with the outer conductors.

* * * * *